(12) United States Patent
Tokunaga

(10) Patent No.: US 7,241,353 B2
(45) Date of Patent: Jul. 10, 2007

(54) METHOD OF MANUFACTURING TIRE

(75) Inventor: Toshio Tokunaga, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 37 days.

(21) Appl. No.: 10/488,600

(22) PCT Filed: Aug. 28, 2002

(86) PCT No.: PCT/JP02/08684

§ 371 (c)(1),
(2), (4) Date: Mar. 5, 2004

(87) PCT Pub. No.: WO03/022558

PCT Pub. Date: Mar. 20, 2003

(65) Prior Publication Data

US 2005/0000624 A1    Jan. 6, 2005

(30) Foreign Application Priority Data

Sep. 6, 2001   (JP) ............................. 2001-270084

(51) Int. Cl.
*B29D 30/30* (2006.01)

(52) U.S. Cl. .................. 156/111; 156/123; 156/132; 156/133; 156/135

(58) Field of Classification Search .............. 156/111, 156/133, 396, 130, 130.3, 131, 132, 135, 156/398, 400
See application file for complete search history.

(56) References Cited

U.S. PATENT DOCUMENTS

| 4,427,473 | A | | 1/1984 | Shichman et al. | |
|---|---|---|---|---|---|
| 4,468,267 | A | * | 8/1984 | Irie | 156/132 |
| 5,464,489 | A | * | 11/1995 | De Graaf | 156/126 |
| 5,591,288 | A | | 1/1997 | Becker et al. | |
| 5,746,860 | A | * | 5/1998 | Moriyama | 156/111 |
| 6,022,434 | A | | 2/2000 | Willard, Jr. et al. | |
| 6,235,135 | B1 | * | 5/2001 | Sergel et al. | 156/131 |
| 6,488,797 | B1 | * | 12/2002 | Kirby | 156/131 |

FOREIGN PATENT DOCUMENTS

| EP | 0 634 266 A3 | 1/1995 |
|---|---|---|
| EP | 0 822 105 A3 | 11/1999 |

(Continued)

*Primary Examiner*—Geoffrey L. Knable
(74) *Attorney, Agent, or Firm*—Sughrue Mion, PLLC

(57) ABSTRACT

There is provided a method of manufacturing a tire wherein a uniformity of a tire having a reinforcing rubber layer of substantially a crescent-shaped section between a carcass and an innerliner and capable of mainly running at a run-flat state is improved by transferring a carcass band prior to turning of a carcass member around a bead core to a green tire building drum of a cylindrical form from outside in a radial direction, holding the bead core by the green tire building drum, deforming a main body portion of the carcass, turning a turnup portion thereof, attaching an innerliner rubber 12 onto an outer periphery of a first band building drum in a cylindrical form, relatively reducing a size of a reinforcing rubber overlap region of the innerliner rubber 12 every axial position by two times a thickness of the reinforcing rubber substantially corresponding to such a position as compared with a reinforcing rubber non-corresponding region, and then attaching a reinforcing rubber 13 onto the relatively size-reduced outer periphery of the reinforcing rubber overlap region of the innerliner rubber.

6 Claims, 14 Drawing Sheets

FOREIGN PATENT DOCUMENTS

| | | |
|---|---|---|
| JP | 55-114556 A | 9/1980 |
| JP | 58-224734 A | 12/1983 |
| JP | 7-52275 A | 2/1995 |
| JP | 10-71807 A | 3/1998 |
| WO | WO 00/78563 A | 12/2000 |
| WO | WO 01/85475 A | 11/2001 |

* cited by examiner 41b 41a 41b 41a 41b (a)

(b)

METHOD OF MANUFACTURING TIRE

TECHNICAL FIELD

This invention relates to a method of manufacturing a tire provided with a reinforcing rubber layer of substantially a crescent-shaped section between a carcass and an innerliner and capable of mainly running at a run-flat state, and more particularly to a tire building method for improving a tire uniformity.

BACKGROUND ART

In case of manufacturing a pneumatic tire capable of running at a run-flat state wherein a side portion of the tire is reinforced with a reinforcing rubber layer, a conventional manufacturing method is explained with reference to FIG. 20 showing a diagrammatically section view of a building drum at a state of attaching each member thereto. As shown in FIG. 20(a), an innerliner rubber 92 is attached onto an outer periphery of a first stage cylindrical building drum 81 to render into a cylinder, and thereafter a reinforcing rubber 93 of substantially a crescent-shaped section is attached onto an outer periphery of each axially side portion of the innerliner rubber 92, and then a carcass member 94 having a width wider than that of the innerliner rubber 92 is attached onto outer peripheries of the innerliner rubber 92, the reinforcing rubber 93 and the building drum 81.

As shown in FIG. 20(b), the building drum 81 is expanded outward in a radial direction between a pair of fold bladders 82 to enlarge a size of a whole of the reinforcing rubber 93 and the innerliner rubber 92 and a size of an axially central portion of the carcass member 94, and a bead core 96 is set to a step difference located at a boundary between the axially central portion and axially outer end portion of the carcass member 94 while closely adhering thereto.

Thereafter, the bladder 82 is expanded to turn up the carcass member 94 located outward from the bead core 96 in the axial direction around the bead core 96, while a sidewall rubber is attached onto the outer periphery of the carcass member 94, whereby a green case 98 is built.

Then, as shown in FIG. 21, the green case 98 is taken out from the first stage building drum 81 and mounted onto a second stage building drum 83, and thereafter the green case 98 is deformed into substantially a toroidal form by approaching the bead cores 96 to each other, while a belt-tread band 99 previously formed on another band building drum and comprised of a cylindrically formed belt member and tread rubber is entered onto a radially outside of the green case 98 and the size of the green case 98 is enlarged to build a green tire. Next, the green tire is transported into a vulcanization mold and vulcanized to manufacture a pneumatic tire.

In the conventional method of manufacturing the pneumatic tire, however, there are some problems. As a first problem, in such a conventional tire manufacturing method, each of the axially outer portions of the carcass member 94 is turned around the bead core 96 at the first stage building drum 81, and thereafter the green case 98 is taken out from the first stage building drum 81 and mounted onto the second stage building drum 83 to deform into a toroidal form. In this case, a relative position relationship between each bead core 96 and the second stage building drum 83 scatters at peripheral positions and hence even if the belt-tread band 99 is accurately transferred onto a given position of the second stage building drum 83, a relative position of the belt-tread band 99 to both the bead cores 96 scatters at peripheral positions, which is a cause of lowering the uniformity.

This scattering is caused as follows. That is, when the carcass member is turned around the bead core 96 at the first stage building drum 81, residual stress is produced in a bead portion of the green case 98, so that when the green case 98 is taken out from the first stage building drum 81 while being gripped from outside, the bead portion of the green case 98 is complicatedly deformed by the residual stress and hence the position relationship between the bead core 96 and the outer surface of the bead portion scatters at positions in the peripheral direction. Therefore, when such a green case is mounted onto the second stage building drum 83, the relative position of the bead core 96 to a rim of the second stage building drum 83 holding the bead core 96 by engaging with the outer surface of the bead portion scatters at peripheral positions.

As a second problem, after the reinforcing rubber 93 of substantially the crescent-shaped section is attached onto the outer periphery of the cylindrical innerliner rubber 92 at the first stage building drum, the carcass member 94 is attached onto the outer peripheries of the innerliner rubber 92, the reinforcing rubber 93 and the building drum 81. In this case, however, since the outer peripheral face of the reinforcing rubber 93 is not flat, cord paths of the carcass member 94 to be attached onto this outer peripheral face become unstable, which scatters the relative position relationship between each bead core and the belt-tread band 99 at peripheral positions and is another factor of lowering the uniformity.

As a third problem, when the carcass member 94 is attached onto the outer periphery of the reinforcing rubber 93, a closed space 97 is formed between a central portion of the carcass member 94 sandwiched by both the reinforcing rubbers and a central portion of the innerliner rubber 92, and thereafter the carcass member 94.between both the reinforcing rubbers 93 and the innerliner rubber 92 are laminated with each other. In this case, it is considerably difficult to completely remove a greater amount of air encapsulated in the closed space 97, so that there is a problem that an air remains in a product tire or an extra deformation is caused in the lamination to generate wrinkles in the innerliner rubber 92.

In order to solve the above problems, there is proposed such a method that a first stage building drum 81A, an outer diameter of a central portion of which being larger than diameters of both side end portions as shown in FIG. 22(a) is used to attach the innerliner rubber 92 onto the outer periphery of the central portion and then the reinforcing rubber 93 of substantially the crescent-shaped section is attached along the outer peripheral faces of both the side end portions of the building drum 81A to flatten a face of attaching the carcass member as shown in FIG. 22(b). In this case, however, the size of the innerliner 92 is reduced at both the axially side end portions of the building drum 81A in the attachment of the reinforcing rubber and hence wrinkles are generated.

In the light of the above problems, the invention is made and is to provide a method of manufacturing a tire in which the scattering of the relative position relationship between both bead cores and the belt-tread band at peripheral positions is controlled to improve the uniformity of the tire and to cause no occurrence of wrinkles in the innerliner rubber and air remaining between the carcass member and the innerliner rubber.

DISCLOSURE OF THE INVENTION

The invention is made for achieving the above object and the summary, construction and action thereof are as follows.

(1) According to the invention, there is provided a method of manufacturing a tire comprising a tread, a sidewall connecting to a side portion of the tread and extending inward in a radial direction, a bead core disposed at an inner peripheral side of the sidewall, a carcass toroidally extending between a pair of the bead cores and turned at its side portion around the bead core toward an outside in the radial direction, a belt disposed on a central portion of the carcass at an outer peripheral side thereof in an axial direction, an innerliner arranged at an inner peripheral side of the carcass, and a reinforcing rubber layer of substantially a crescent-shaped section interposed between the carcass and the innerliner, which comprises;

a step of attaching a pair of sidewall rubbers and an innerliner rubber onto an outer periphery of a first band building drum of a cylindrical form to render them into a cylindrical form, attaching a pair of reinforcing rubbers of substantially a crescent-shaped section onto an outer periphery of the innerliner rubber, attaching a carcass member having a width wider than that of the innerliner rubber onto outer peripheries of the sidewall rubber, the innerliner rubber and the reinforcing rubber, setting a bead core onto an outer periphery of a portion of the carcass member located outward from the reinforcing rubber in an axial direction to build a carcass band, and transferring the carcass band from the first band building drum onto an outside of a cylindrical green tire building drum in a radial direction;

a step of attaching a belt member and a tread rubber onto an outer periphery of a cylindrical second band building drum to build a belt-tread band having an inner diameter larger than an outer diameter of the carcass band, and transferring the belt-tread band from the second band building drum onto the outside of the green tire building drum in the radial direction;

a step of toroidally enlarging a main body portion of the carcass member by reducing a distance between both the bead cores while holding the bead cores in the carcass band on the green tire building drum and pressing an outer periphery of an axially central portion of the carcass band to an inner periphery of the belt-tread band; and a step of turning the sidewall rubber and a turnup portion of the carcass member while holding the bead cores in the carcass band;

wherein a size of a reinforcing rubber overlap region of the innerliner rubber to be attached with the reinforcing rubber is relatively reduced with respect to a size of a reinforcing rubber non-overlap region corresponding to a remaining portion of the innerliner rubber prior to the attachment of the reinforcing rubber onto the outer periphery of the innerliner rubber at the first band building drum and size reducing amounts of these overlap regions at positions in the axial direction are made approximately two times a thickness of the reinforcing rubber corresponding to each position.

According to the tire manufacturing method of the invention, the carcass band before the turning of the carcass band around the bead core is transferred onto the outside of the cylindrical green tire building drum in the radial direction, so that the bead core can be accurately located with the green tire building drum. Then, when the surface of the bead portion is gripped by a bead lock part in the green tire building drum, residual stress due to the turning is not generated in the bead portion, so that the bead core can be uniformly gripped over the full periphery with respect to the green tire building drum and hence the scattering of the relative position of the bead core in the peripheral direction with respect to the green tire building drum can be largely reduced.

Thereafter, the carcass member is turned to press the carcass band to the belt-tread band while holding the bead core by the bead lock part in the green tire building drum, so that the relative position relationship between these bands can be uniformly held over the full periphery to improve the tire uniformity.

In the tire manufacturing method of the invention, the carcass band is built on the first band building drum for exclusive use in the attachment of the member not possessing both a function of turning both side portions of the carcass band and a function of toroidally expanding the central portion of the carcass band and having a high attachment accuracy, so that the formation of the carcass band can be carried out in a high accuracy, which can contribute to the improvement of the tire uniformity.

In the tire manufacturing method of the invention, after the innerliner rubber is attached onto the outer periphery of the first band building drum in the form of the cylinder, the size of the reinforcing rubber overlap region of the innerliner rubber every axial position is relatively reduced by two times the thickness of the reinforcing rubber every the axial position in correspondence with the axial position with respect to the size of the reinforcing rubber non-overlap region, and then the reinforcing rubber is attached to the outer periphery of the relatively size-reduced reinforcing rubber overlap region of the innerliner rubber, so that the outer periphery face connecting from the innerliner rubber in the reinforcing rubber non-overlap region to the reinforcing rubber can be made substantially flat. Then, the carcass member is attached onto the substantially flat outer periphery face, so that cord paths in the carcass member become stable over the full periphery, which can improve the tire uniformity without scattering at positions in the peripheral direction.

Further, by attaching the carcass member onto substantially the flat outer periphery face, there is caused no occurrence of air remaining in an inner peripheral side of the carcass member nor occurrence of wrinkles in the innerliner rubber resulted from extra deformation in the attachment of the carcass member.

Moreover, in the tire manufacturing method of the invention, the size of the reinforcing rubber overlap region of the innerliner rubber is relatively reduced with respect to the reinforcing rubber non-overlap region thereof. Such a relative size reduction means that the reinforcing rubber overlap region is reduced with respect to the reinforcing rubber non-overlap region causing no change of the size but also the size of the reinforcing rubber non-overlap region is enlarged with respect to the reinforcing rubber overlap region causing no change of the size.

(2) In the tire manufacturing method of the invention described in the item (1), a size of a portion of the first band building drum corresponding to the reinforcing rubber non-overlap region of the innerliner rubber is enlarged by approximately two times a maximum thickness of the reinforcing rubber outward in the radial direction to relatively reduce the size of the reinforcing rubber overlap region of the innerliner rubber.

In this tire manufacturing method, the size of the portion of the first band building drum corresponding to the reinforcing rubber non-overlap region of the innerliner rubber is enlarged outward in the radial direction to enlarge the size of the innerliner rubber in the reinforcing rubber non-overlap region, so that there is caused no wrinkle in the innerliner rubber in the course of such a size enlargement. Also, since the size-enlarged amount is approximately two times the maximum thickness of the reinforcing rubber, a recess portion having substantially the same section as the reinforcing rubber can be formed in the innerliner rubber at the reinforcing rubber overlap region viewing at a meridional section.

(3) In the tire manufacturing method of the invention described in the item (1), when the innerliner rubber is attached onto the outer periphery of the first band building drum, a size of a portion of the first band building drum corresponding to the reinforcing rubber in correspondence with the reinforcing rubber overlap region of the innerliner rubber is made smaller than a size of a portion of the drum adjacent to the reinforcing rubber corresponding portion, and a size difference of the reinforcing rubber corresponding portion to the portion adjacent thereto every axial position is approximately two times the thickness of the reinforcing rubber at each position, and after the innerliner rubber is attached onto the outer periphery of the drum, an annular space defined by the reinforcing rubber overlap region of the innerliner rubber and the reinforcing rubber corresponding portion of the drum is made evenly negative pressure over the full periphery to close the reinforcing rubber overlap region of the innerliner rubber to the reinforcing rubber corresponding portion of the drum to thereby relatively reduce the size of the reinforcing rubber overlap region of the innerliner rubber.

This tire manufacturing method is carried out by evenly making the annular space defined by the reinforcing rubber overlap region of the innerliner rubber and the reinforcing rubber corresponding portion of the drum to a negative pressure over the full periphery to close the reinforcing rubber overlap region of the innerliner rubber to the reinforcing rubber corresponding portion of the drum, so that there is caused no wrinkle in the reinforcing rubber overlap region of the innerliner rubber. Further, it is not required to enlarge the size of the portion of the drum corresponding to the reinforcing rubber non-overlap region of the inner-liner rubber, so that the drum can be simply constructed and the coat can be reduced.

(4) In the tire manufacturing method of the invention described in any one of the items (1) to (3), after the outer periphery of the axially central portion of the carcass band is pressed to the inner periphery of the belt-tread band on the green tire building drum, the belt-tread band is stitched onto the outer periphery of the main body portion of the carcass member in the carcass band over the full width and then the sidewall rubber and the turnup portion of the carcass member are turned.

In this tire manufacturing method, the sidewall rubber is disposed on the outer-periphery of the end portion of the tread rubber, so that the interface between the tread rubber and the sidewall rubber is never located in the shoulder portion having a largest deformation when the product tire is run and hence the tire having a higher durability can be manufactured.

(5) In the tire manufacturing method of the invention described in any one of the items (1) to (3), after the size of the main body portion of the carcass member is enlarged on the green tire building drum in a toroidal form while reducing the distance between both the bead cores, the sidewall rubber and the turnup portion of the carcass member are turned to press the sidewall rubber onto the carcass member over the full width and thereafter the belt-tread band is transferred on the outside of the green tire building drum in the radial direction and then the size of the carcass band is further enlarged to press the outer periphery of the axially central portion of the carcass band onto the inner periphery of the belt-tread band and further the belt-tread band is stitched on the outer peripheries of the sidewall rubber and the main body portion of the carcass member.

This tire manufacturing method can be preferably used when the tread rubber is constructed by integrally extrusion-shaping a rubber disposed in a widthwise central part and having a high rigidity and an excellent wear resistance and a rubber disposed in both widthwise side parts and having the same material as the sidewall rubber of approximately a triangular section.

(6) In the tire manufacturing method of the invention described in any one of the items (1) to (5), after the carcass member is attached onto the first band building drum and before the setting of the bead core to the outer periphery of the carcass member, the first band building drum is enlarged by a given size over the full length in the axial direction and then the outer peripheral face of the carcass member is stitched from the axial center toward the end portion.

According to this tire manufacturing method, after the attachment of the carcass member on the first band building drum, even if air reservoir is generated between the innerliner rubber and the carcass member or between adjoining plies of the carcass member in case that the carcass member is comprised of plural plies, the outer peripheral face of the carcass member is stitched from the axial center toward the end portion after the first band building drum is enlarged by a given size over the full axial length, so that the air can be discharged. Moreover, this step is conducted prior to the setting of the bead core to the outer periphery of the carcass member, so that the discharge of reserved air toward both outsides in the axial direction can easily be conducted.

In this tire manufacturing method, it is preferable that the size enlarging amount of the first band building drum is 0.7–1.0% of an outer diameter of this drum in the attachment of the innerliner rubber. When the size enlarging amount is less than 0.7%, the sufficient discharge of air and the pressing between the plies can not be attained, while when it exceeds 1.0%, non-uniform size enlargement of the carcass member is caused.

Further, in the tire manufacturing method, it is preferable that when the stitching is carried out from the axial center toward the end portion, the terminal position of the stitching motion in the axial direction is a neighborhood of an end portion of the carcass ply existing in a maximum width thereof. When the terminal position becomes central side from the neighborhood of the end portion, the pressing between the plies is insufficient and the flow crack is generated in the carcass member after the turning. When the terminal position becomes outward therefrom in the axial direction, the sidewall rubber is also stitched and hence wrinkles are generated in the sidewall rubber.

(7) In the tire manufacturing method of the invention described in any one of the items (1) to (6), when the bead core is set to the outer periphery of the carcass member on the first band building drum, the setting of the bead core is carried out by locating the bead core in an axial setting position on the carcass member outward in the radial direction, enlarging the size of the first band building drum, and pressing the outer peripheral face of the carcass member to the inner peripheral face of the bead core.

According to this tire manufacturing method, the bead core is located in the axial setting position on the carcass member outward in the radial direction, so that both the bead cores can be accurately positioned with respect to the first band building drum. Further, the size of the first band building drum is enlarged to uniformly enlarge the carcass member over the axial full length, whereby the outer peripheral face of the carcass member is pressed to the inner peripheral face of the bead core to set the bead core to the outer periphery of the carcass member, so that there are not caused the slippage in the pressing and the generation of non-uniform residual stress in the carcass member in the vicinity of the bead core as compared with a case that only a portion of the carcass member corresponding to the neighborhood of the bead core is enlarged. As a result, the position accuracy of the bead core can be maintained at a high level even after the carcass band is taken out from the first band building drum and hence the uniformity can be improved.

(8) In the tire manufacturing method of the invention described in any one of the items (1) to (7), when the main body portion of the carcass member is toroidally enlarged on the green tire building drum, a rigid segment having an outer peripheral face form corresponding to a part of an inner peripheral face form of a reinforcing rubber layer in a product tire is enlarged to enlarge the size of the reinforcing rubber.

In this tire manufacturing method, the rigid segment having the outer peripheral form corresponding to a part of the inner peripheral face form of the reinforcing rubber layer having substantially a crescent-shaped section in the product tire is enlarged to enlarge the size of the reinforcing rubber having substantially a crescent-shaped section, so that the reinforcing rubber can be surely deformed into a given form in the green tire over the full periphery and hence the uniformity can be improved.

Also, the rigid segment possesses an action of preventing the slippage of the bead core toward the central side in the axial direction when the sidewall rubber and the turnup portion of the carcass member are turned.

The rigid segment is preferable to be contacted with a portion of the innerliner at least extending from the bead core to 50 mm outward from the bead core in the radial direction. When the contacting portion is too narrow, the slippage of the bead core toward the central side in the axial direction can not be completely prevented.

BEST MODE FOR CARRYING OUT THE INVENTION

Figure 1:
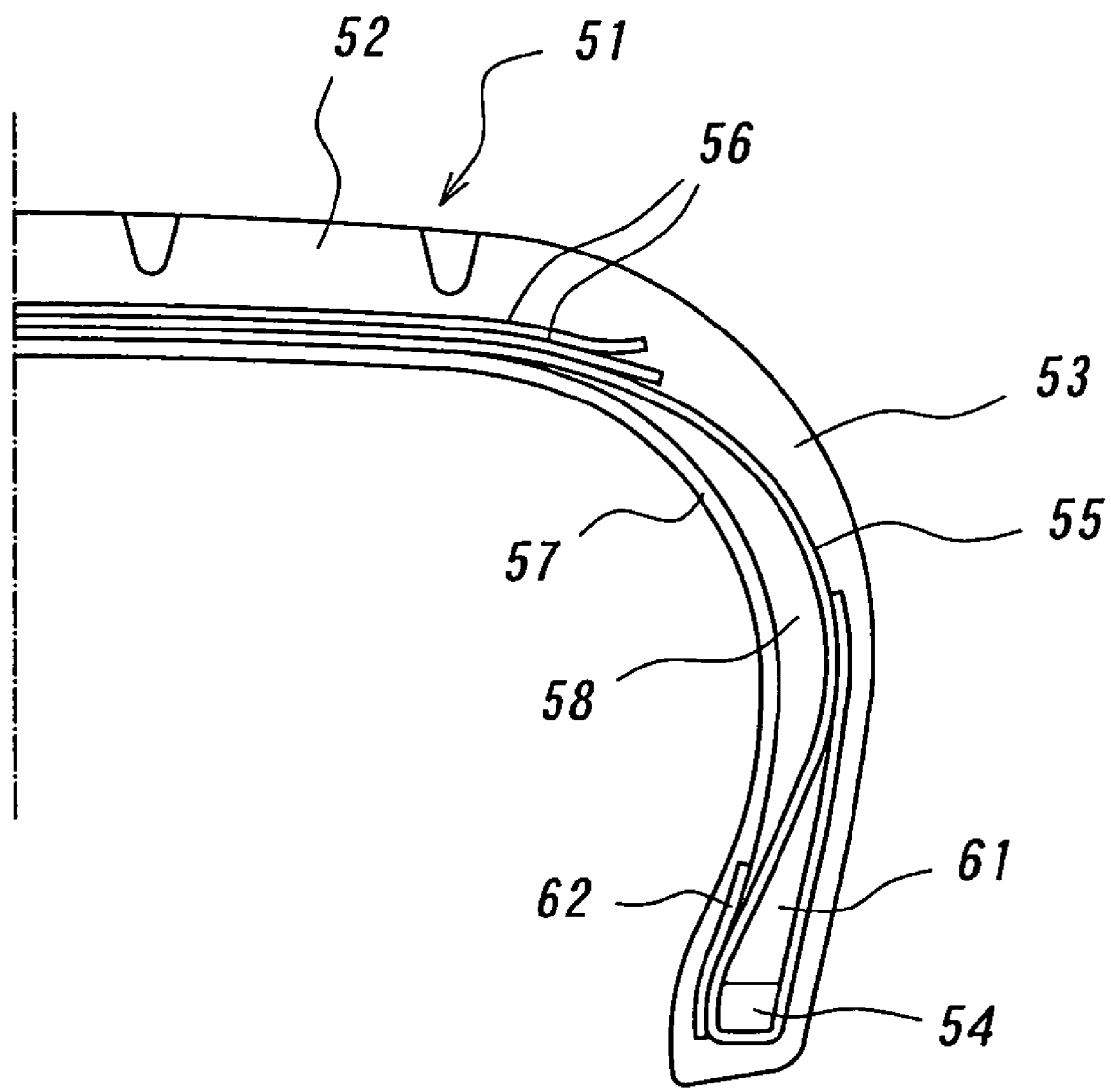
FIG. 1 is a meridional section view of a tire.

An embodiment of the invention will be described with reference to the drawings below. FIG. 1 is a meridional section view of a tire according to the invention. Numeral 51 is a pneumatic radial tire capable of running at a run-flat state. The tire 51 comprises a tread 52, a sidewall 53 extending inward from each side portion of the tread 52 in a radial direction, a bead core 54 disposed at an inner peripheral side of the sidewall 53, a carcass 55 toroidally extending between the bead cores 54 and wound around each bead core 54 outward in the radial direction, a belt 56 disposed on an axially central part of the carcass 55 at its outer peripheral side and an innerliner 57 disposed at an inner peripheral side of the carcass 55 and extending from one bead core 54 to the other bead core 54, in which a reinforcing rubber layer 58 of substantially a crescent-shaped section is interposed between the innerliner 57 and the carcass 55.

Also, in a bead portion of the tire 51, a bead filler 61 is arranged on an outer periphery of each of the bead cores 54 in the radial direction, and a chafer layer 62 is arranged at an axially central side of a main body portion of the carcass 55 in the tire.

The reinforcing rubber layer 58 is made of a relatively hard rubber and extends to the vicinity of the bead core 54 and to the vicinity of each end of the tread while gradually reducing the thickness thereof. This reinforcing rubber layer 58 guarantees the running at a run-flat state over a given distance while bearing a load applied to the tire 51 if an internal pressure of the tire 51 drops during the, running.

Figure 2:
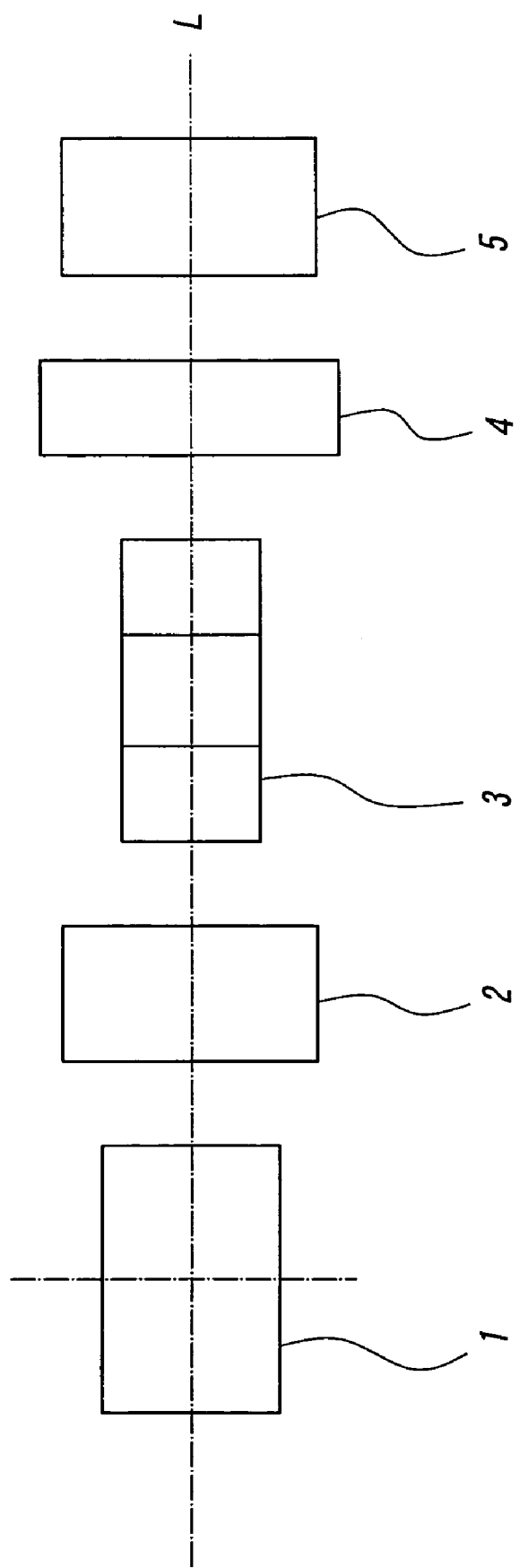
FIG. 2 is a front view partly shown in section of a building machine according to the invention.

A first embodiment of the method of manufacturing the tire 51 according to the invention will be described below. FIG. 2 is a schematic view of an arrangement of a building machine for building the tire 51. In the building of the tire 51, plural members including a carcass member are attached on a first band building drum (hereinafter referred to as "CB drum") 1 to form a carcass band (hereinafter referred to as "CB band"), and then the CB band is transferred from the CB drum 1 to a green tire building drum (hereinafter referred to as "GT drum") 3 with a CB band transfer device 2.

On the other hand, belt member and tread rubber are laminated on a second band building drum (hereinafter referred to as "BT drum") 5 to form a belt-tread band (hereinafter referred to as "BT band"), which is also transferred to the GT drum 3 with a BT band transfer device 4. In the GT drum 3, an axially central portion of the CB band is deformed into a toroidal form and axially side portions of the CB band are turned, and then combined with the BT band to form a green tire. Each of these steps is described in detail below.

Figure 3:
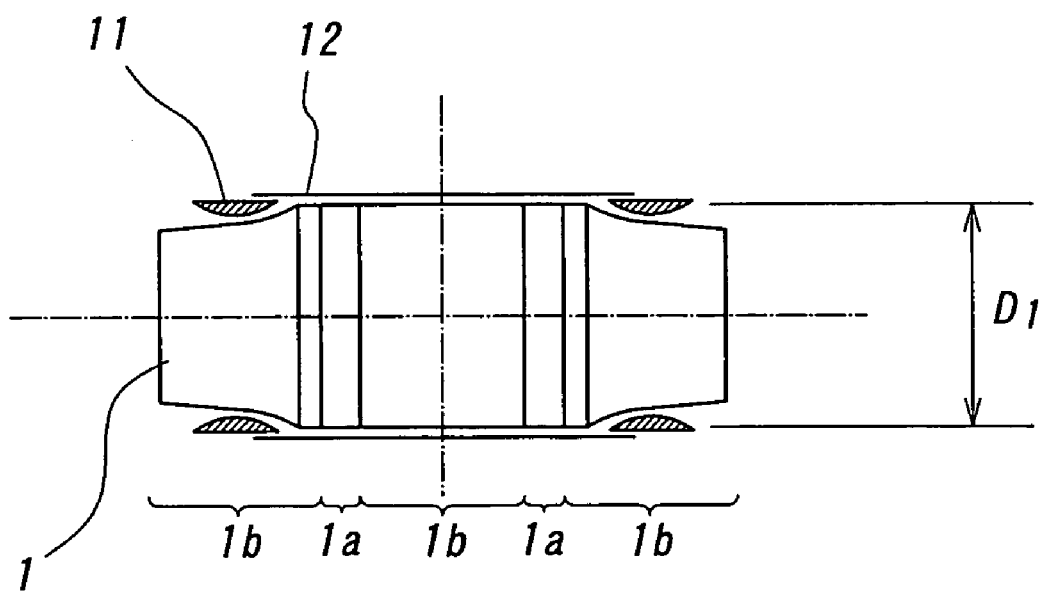
FIG. 3 is a front view partly shown in section illustrating a step of the tire manufacturing method in a first embodiment of the invention.

FIG. 3 is a front view partly shown in section of the CB drum illustrating a state that a sidewall rubber 11 is attached onto an outer periphery of an size-enlargeable CB drum 1 and then an innerliner rubber 12 is attached thereonto. In this case, a diameter of the outer periphery of the CB drum 1 is D1.

The CB drum 1 is divided into two reinforcing rubber corresponding portions 1*a* corresponding to axial positions for attaching the reinforcing rubber and reinforcing rubber non-corresponding portions 1*b*, in which these reinforcing rubber non-corresponding portions 1*b* are constructed enabling to enlarge with respect to the reinforcing rubber-corresponding portions 1*a*. Also, both outer portions in the reinforcing rubber non-corresponding portions 1*b* are formed so as to have a size smaller than those of the other portions by only a thickness of the sidewall rubber.

Figure 4:
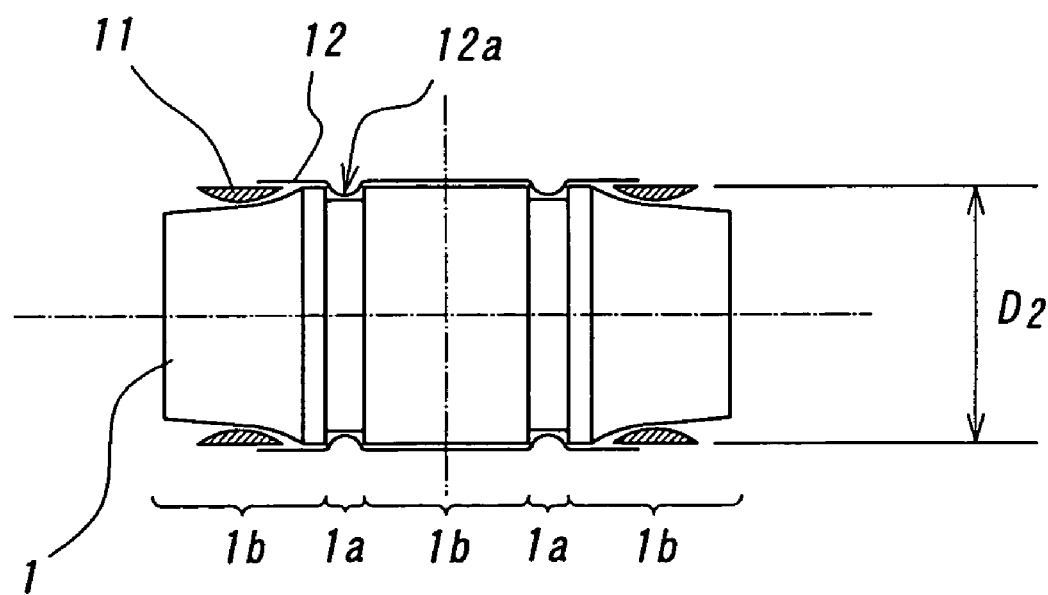
FIG. 4 is a front view partly shown in section illustrating a step followed by FIG. 3.

As shown in FIG. 4, only the sizes of the reinforcing rubber non-corresponding portions 1*b* of the CB drum 1 are enlarged to an outer diameter of D2. In this way, only the sizes of the reinforcing rubber overlap regions 12*a* of the innerliner rubber 12 to be attached with the reinforcing rubber are not enlarged, so that each recess having a section approximately similar to a section of the reinforcing rubber can be formed in each of these regions.

Figure 5:
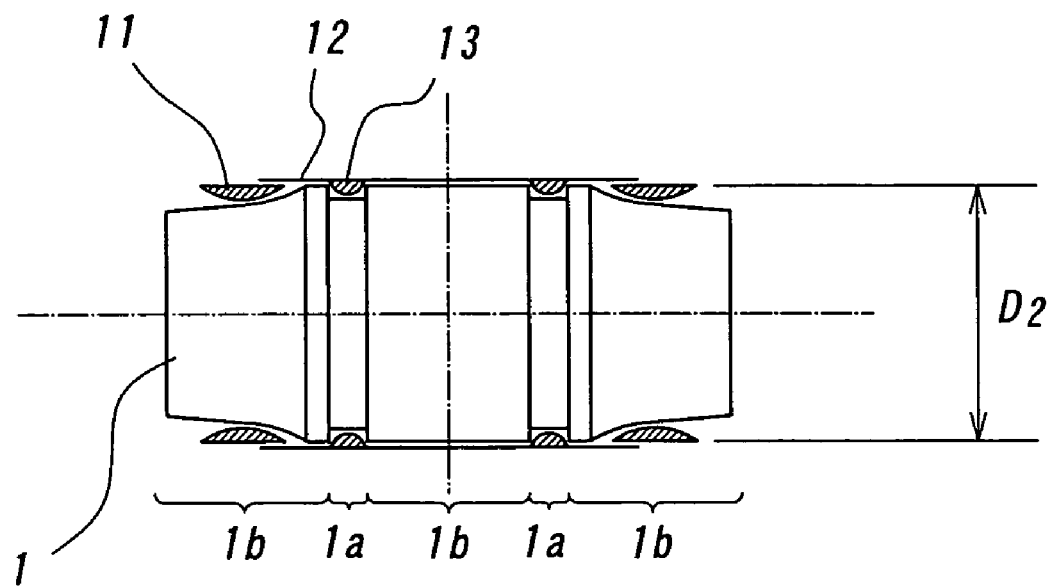
FIG. 5 is a front view partly shown in section illustrating a step followed by FIG. 4.

As shown in FIG. 5, the reinforcing rubber 13 is attached onto an outer periphery of the reinforcing rubber overlap region 12*a* of the innerliner rubber. In this case, outer peripheral faces of the sidewall rubbers 11, the innerliner rubber 12 and the reinforcing rubbers 13 can form substantially a flat cylindrical face.

Figure 6:
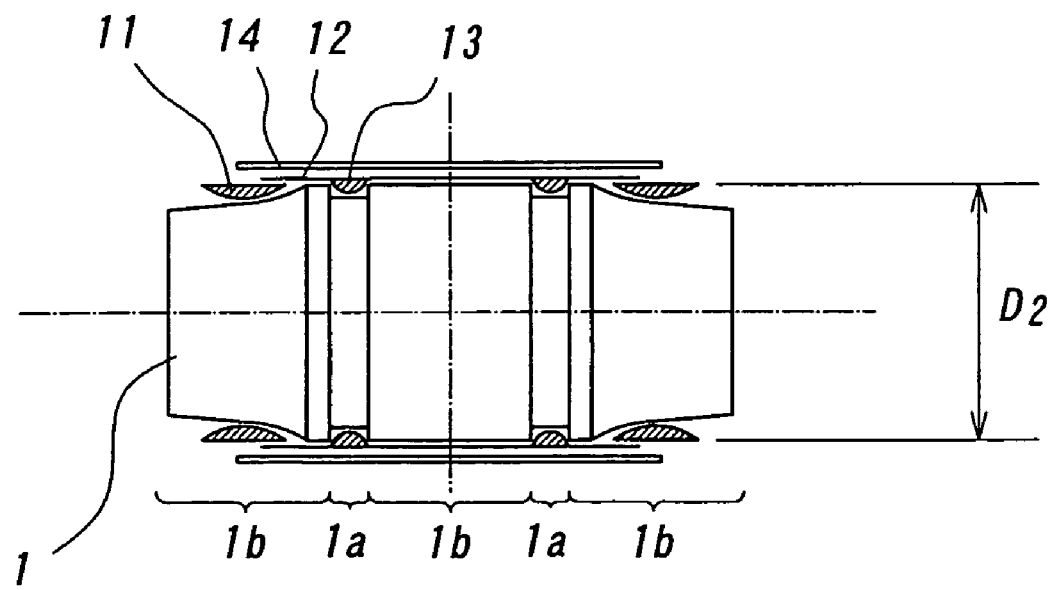
FIG. 6 is a front view partly shown in section illustrating a step followed by FIG. 5.

FIG. 6 shows a state of attaching a carcass member 14 onto the flat cylindrical face. Since the attaching face of the carcass member is flat, cord paths in the carcass member 14 become stable and may be uniform over the full periphery, which can contribute to the improvement of the uniformity.

Moreover, the carcass member 14 is usually comprised of from one ply to three plies. These plies are wound from inside in order. Also, an innermost carcass ply is usually supplied after a chafer member not shown is preset at a position of an inner periphery of the ply in vicinity of the bead core.

Figure 7:
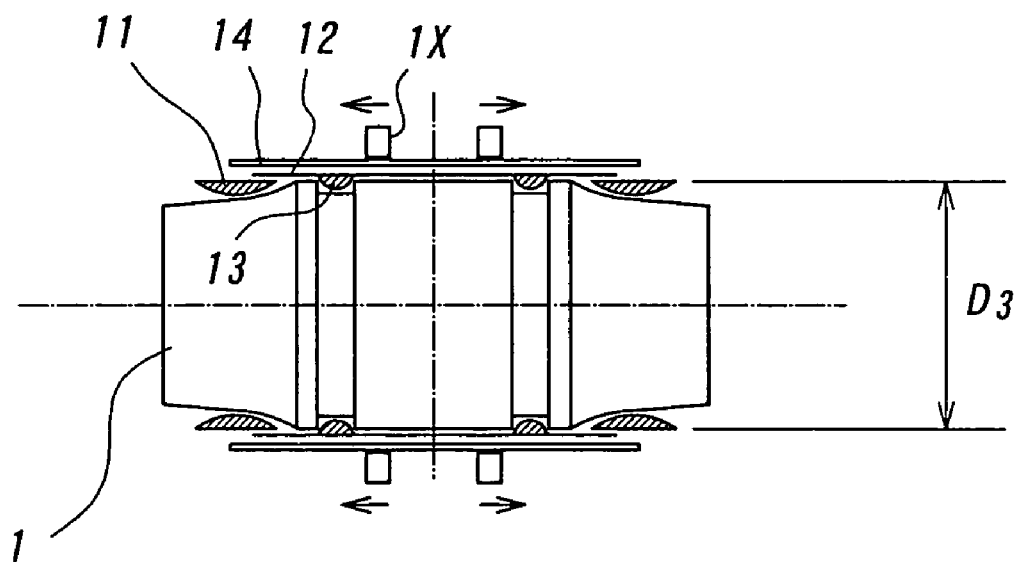
FIG. 7 is a front view partly shown in section illustrating a step followed by FIG. 6.

Then, as shown in FIG. 7, the size of the CB drum 1 is enlarged over the full length in the axial direction to render the outer diameter into D3, while the CB drum 1 is rotated, during which a stitching roller 1X is pushed onto the carcass member 14 and moved from an axially central part toward each end part. In this step, air reservoir retained between the innerliner rubber 12 or the reinforcing rubber 13 and the carcass member 14 can be surely discharged.

In this case, it is preferable that the size enlarging amount of the CB drum 1 is 0.7–1.0% of the outer diameter D1 of the CB drum 1 in the attaching of the innerliner rubber 12, and the terminal position in the moving of the stitching roller 1X toward each end part in the axial direction is the neighborhood of the axially end part of the carcass ply at the maximum width thereof as previously mentioned.

Figure 8:
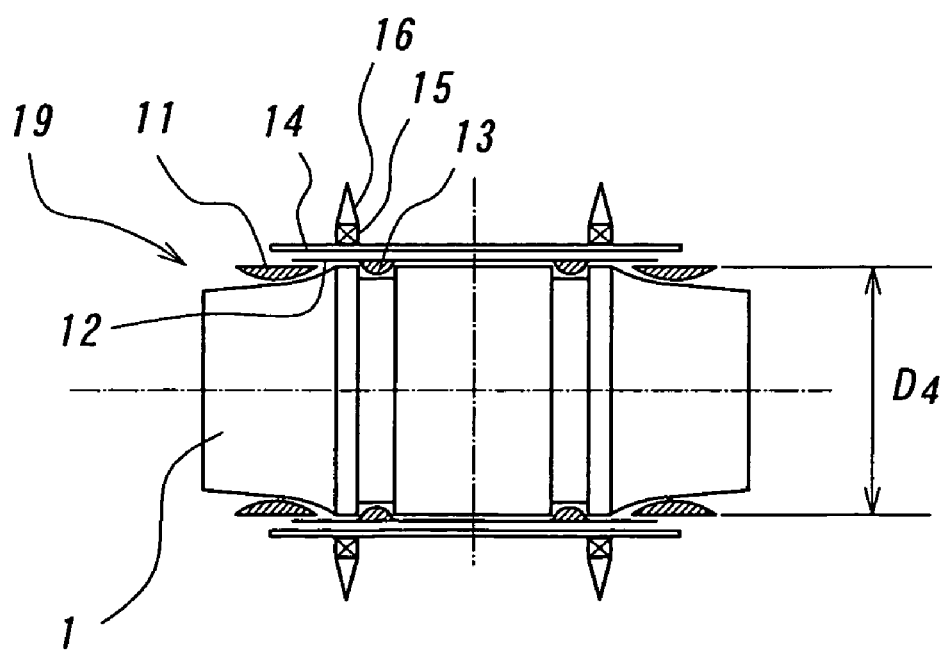
FIG. 8 is a front view partly shown in section illustrating a step followed by FIG. 7.

Thereafter, a pair of bead cores 15 each preset with a bead filler rubber 16 is transferred to radially outer and axially given positions of the carcass member 14 while gripping them with a bead supply device not shown. Then, as shown in FIG. 8, the size of the CB drum is further enlarged over the full length in the axial direction to render the outer diameter into D4. In this way, the carcass member 14 can be pressed to the bead cores 15 in a high accuracy. The assembly of these members attached at these steps is called as a CB band 19.

Figure 9:
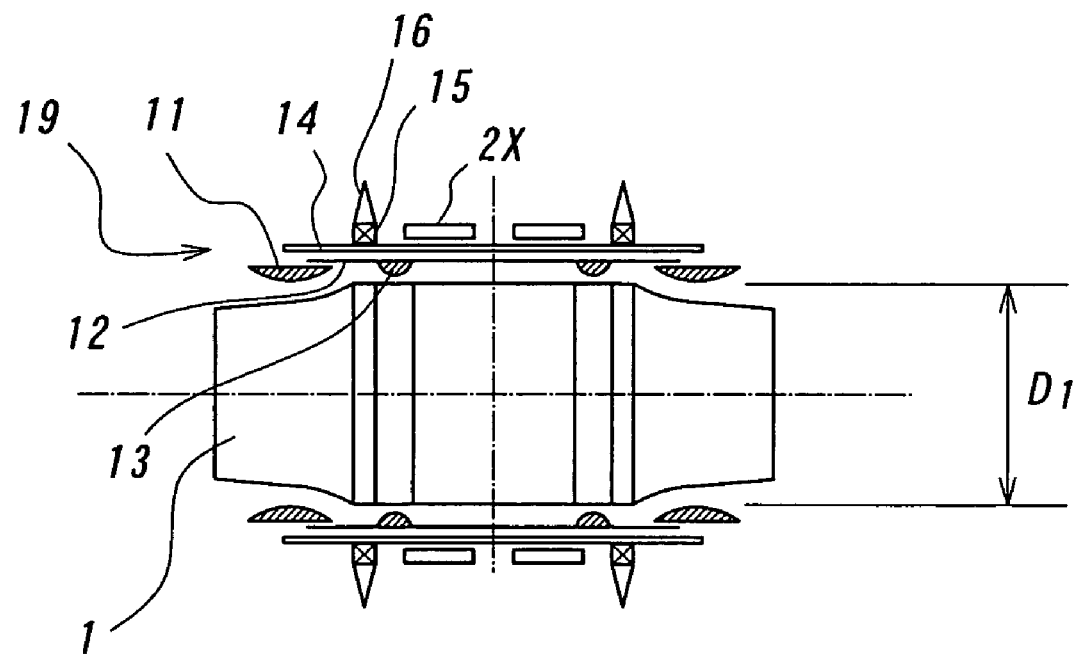
FIG. 9 is a front view partly shown in section illustrating a step followed by FIG. 8.

Next, the CB band transfer device 2 is moved to the CB drum 1 and gripping rings 2X thereof are approached to the CB band 19 from outside in the radial direction, and then the size of the gripping ring 2X is reduced to grip the CB band 19 from the outside in the radial direction. Thereafter, as shown in FIG. 9, the size of the CB drum 1 is reduced to render the outer diameter into original D1, whereby the CB band 19 can be taken out from the CB drum 1 by the CB band transfer device 2 while gripping it with the gripping rings 2X.

Figure 10:
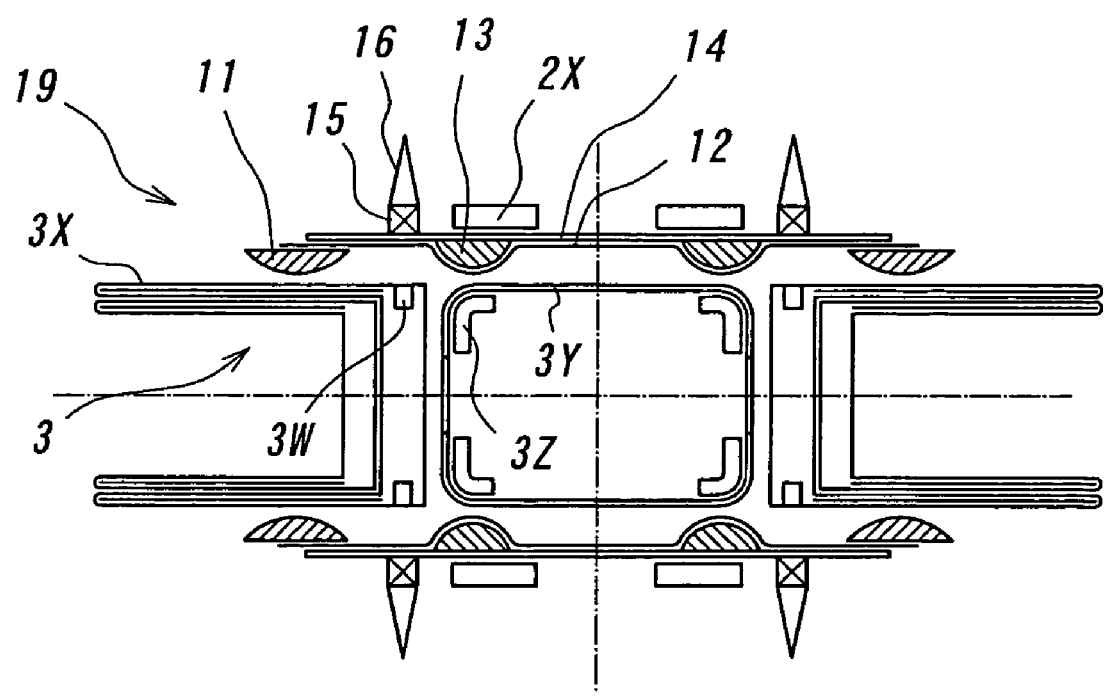
FIG. 10 is a front view partly shown in section illustrating a step followed by FIG. 9.

FIG. 10 shows a state that the CB band 19 is transferred to the GT drum 3 from the outside in the radial direction while gripping with the gripping rings 2X of the CB band transfer device 2. The GT drum 3 is provided with bead lock parts 3W, fold bladders 3X, a center bladder 3Y and rigid segments 3Z.

Figure 11:
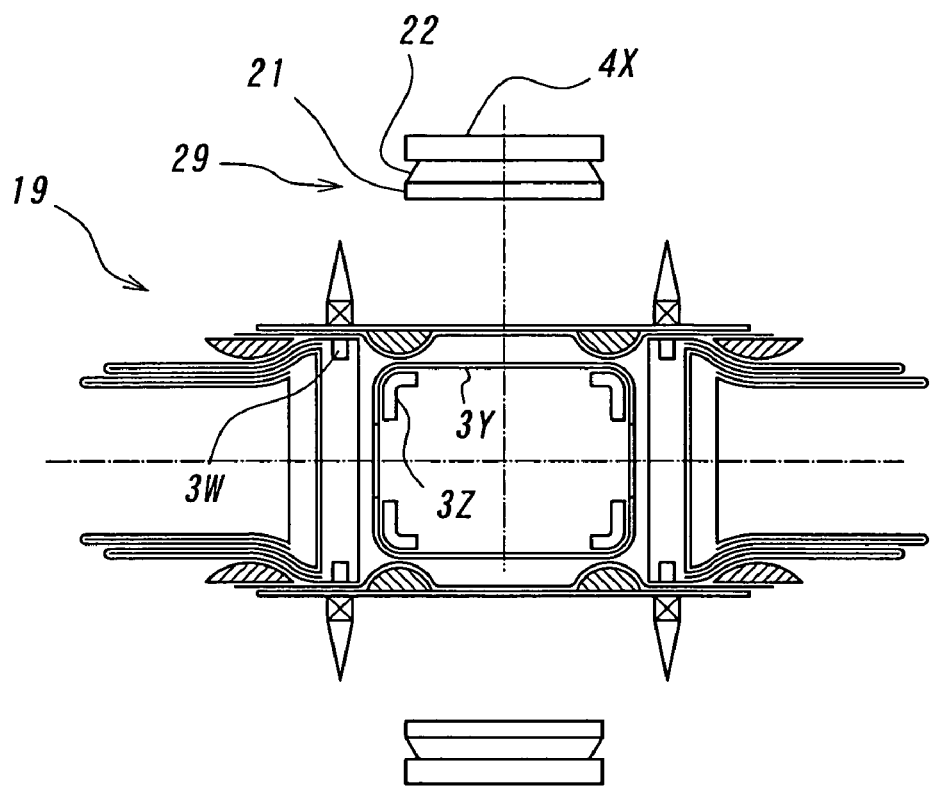
FIG. 11 is a front view partly shown in section illustrating a step followed by FIG. 10.

FIG. 11 shows a state that the sizes of the bead lock parts 3W are enlarged to lock a radially inner portion of the bead core 15 in the CB band 19 to thereby fix the CB band 19 and then the gripping rings 2X of the CB band transfer device 2 are backed out and thereafter the BT band 29 consisting of the belt member 21 and the tread 22 formed on the BT drum 5 is approached from outside in the radial direction by using a gripping ring 4X of the BT band transfer device 4.

Figure 12:
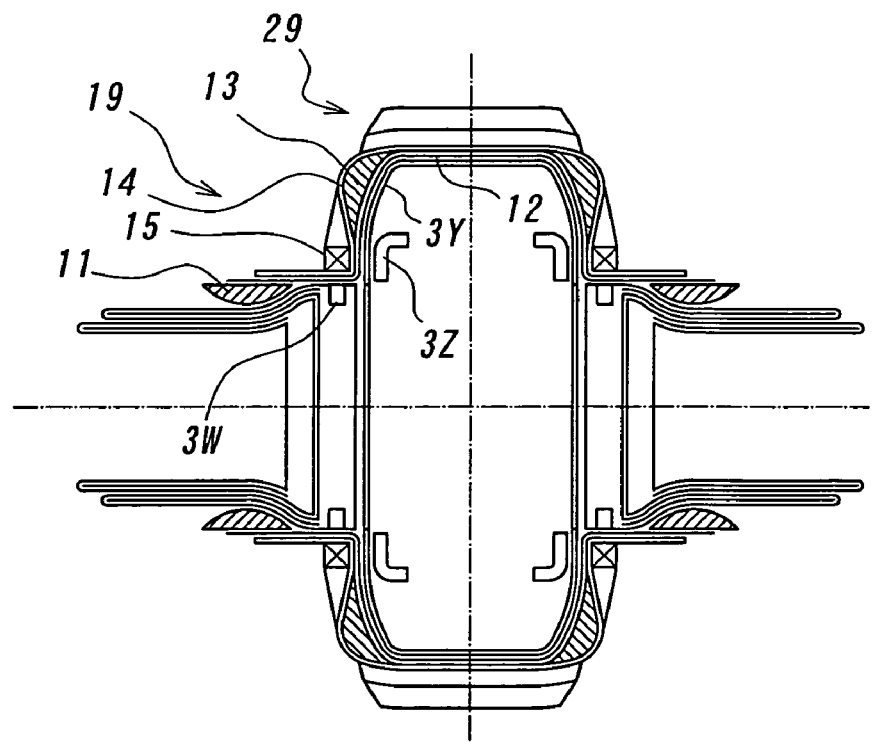
FIG. 12 is a front view partly shown in section illustrating a step followed by FIG. 11.

Thereafter, as shown in FIG. 12, while the CB band 19 is held by the bead lock parts 3W and the BT band 29 is held by the gripping ring 4X of the BT band transfer device 4, the center bladder 3Y is expanded while narrowing the axial distance between both the bead lock parts to deform the main body portion of the carcass member 14 into a toroidal form and press a central portion of the carcass member 14 to an inner peripheral face of the BT band 29. In this case, a plurality of annular rigid segments 3Z adjoining each other and each having an outer peripheral form corresponding to a part of an inner peripheral face of a reinforcing rubber layer in a product tire are enlarged inside the center bladder 3Y while pushing onto an inner periphery of the innerliner rubber 12 located at an inner periphery of the reinforcing rubber 13. In this way, a green tire of a given form can be surely formed while preventing the fall-down of the hard reinforcing rubber toward the inside.

Subsequently, the size of the gripping ring 4X of the BT band transfer device 4 is enlarged to release the BT band 29 from the gripping ring 4X and then the gripping ring 4X is backed out from the GT drum 3, while the tread rubber 22 is subjected from its outer peripheral side to stitching over the full width to surely press the BT band 29 to the carcass member 14 in the CB band 19.

Figure 13:
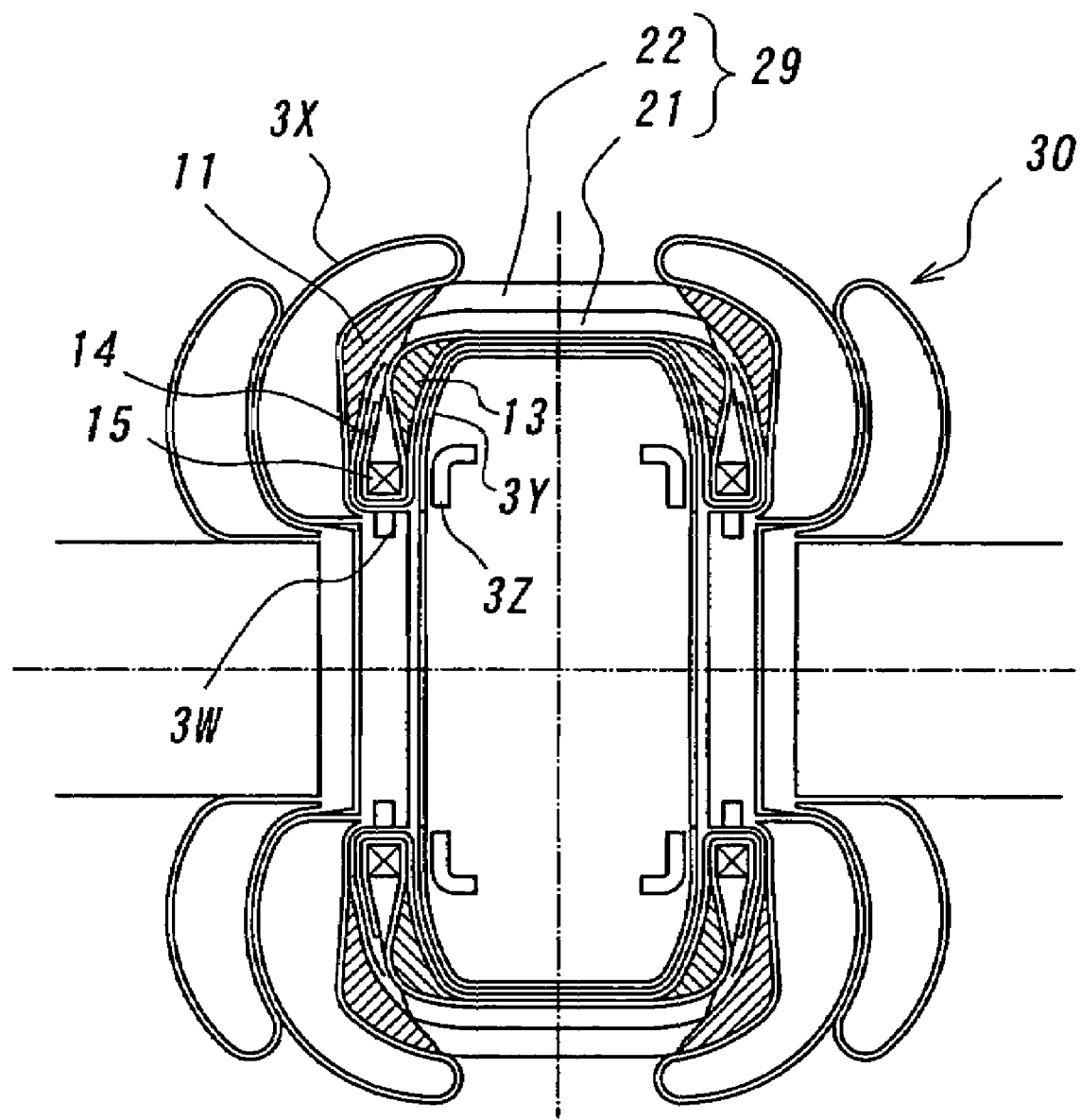
FIG. 13 is a front view partly shown in section illustrating a step followed by FIG. 12.

Then, the fold bladders 3X are expanded while holding the CB band 19 with the bead lock parts 3W to thereby turn the sidewall portion 11 and the turnup portion of the carcass member 14. This state is shown in FIG. 13. In this case, an end portion of the sidewall rubber 11 is located on and overlapped with the outer peripheral side of the tread rubber 22, so that the interface between the sidewall rubber 11 and the tread rubber 22 is not located in the shoulder portion of the tire and hence the occurrence of cracks from such an interface can be prevented.

Thereafter, the size of the fold bladder 15 is reduced and the outer peripheral side of the sidewall rubber 11 is stitched to conduct pressing in the vicinity of the interface to the tread rubber, and then the size of the fold bladder 3X is reduced. Thus, the building of the green tire 30 is completed.

Then, the gripping ring 4X of the BT band transfer device is again entered onto the outer peripheral portion of the GT drum 3 and the size of the gripping ring 4X is reduced to grip the green tire 30 and further the sizes of the center bladder 3Y, rigid segments 3Z and bead lock parts 3W are reduced, whereby the green tire 30 can be taken out from the GT drum 3. Next, the gripping ring 4X is backed out from the GT drum 3 and transferred to a next step.

In this embodiment, the BT band 29 is stitched over the full width outward from the carcass member 14 in the radial direction and the sidewall rubber 11 is turned toward the outer periphery of the tread rubber 22. In case that the tread rubber 22 is constructed by integrally extruding an original tread rubber arranged in a widthwise central part and having a high rigidity and an excellent wear resistance and a rubber having the same material as the sidewall rubber 11 of approximately a triangular section arranged in each of widthwise side parts, there can be used the following method.

Figure 14:
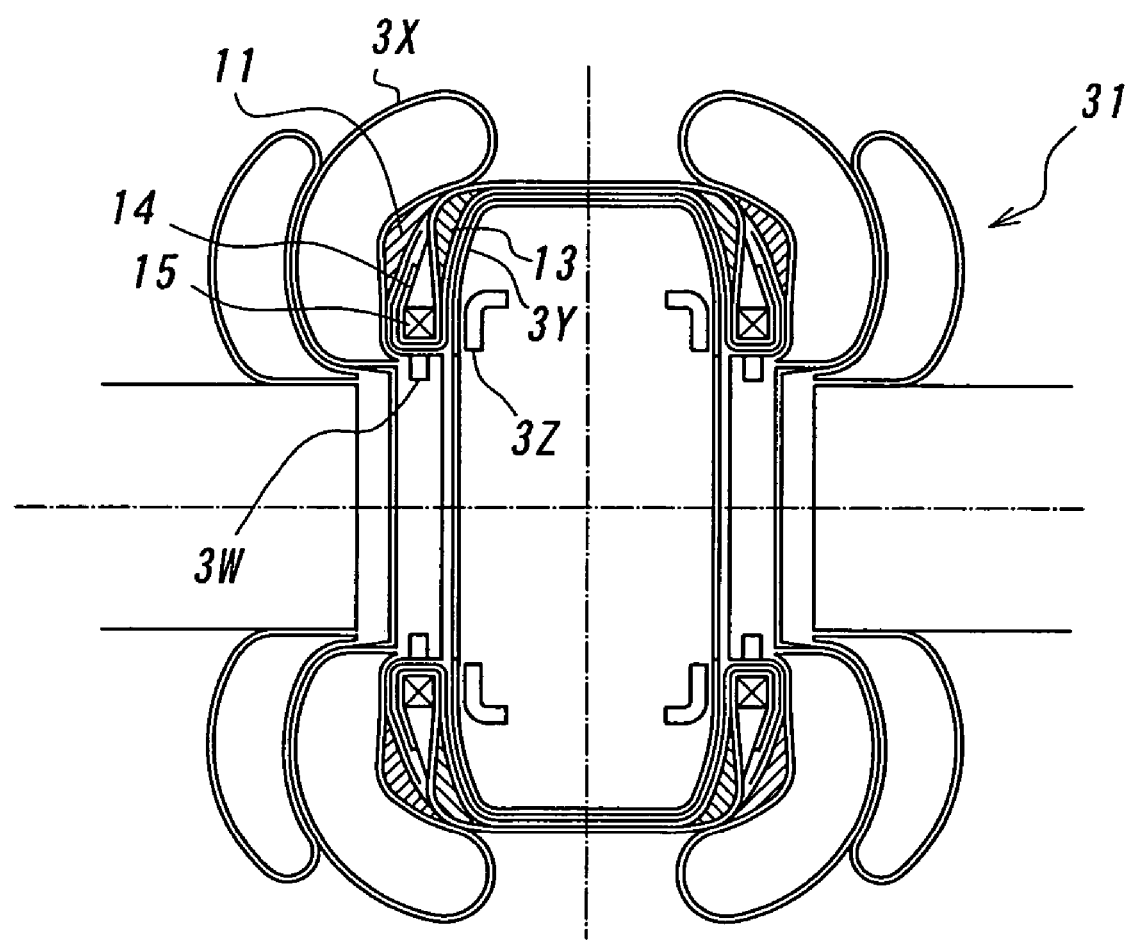
FIG. 14 is a front view partly shown in section illustrating a step of the tire manufacturing method in a first embodiment of the invention.

After the state shown in FIG. 10, as shown in FIG. 14, the inner portion of the bead core 15 of the CB band 19 in the radial direction is locked and kept by the bead lock part 3W, and the sizes of the center bladder 3Y and the rigid segments 3Z are enlarged while narrowing the distance between both the bead lock parts 3W to deform the main body portion of the carcass member 14 into a toroidal form, and thereafter the fold bladder 3X is expanded to turn the sidewall rubber 11 and the turnup portion of the carcass member 14, and just thereafter the end part of the sidewall rubber 11 is stitched to the carcass member to form a green case 31.

Figure 15:
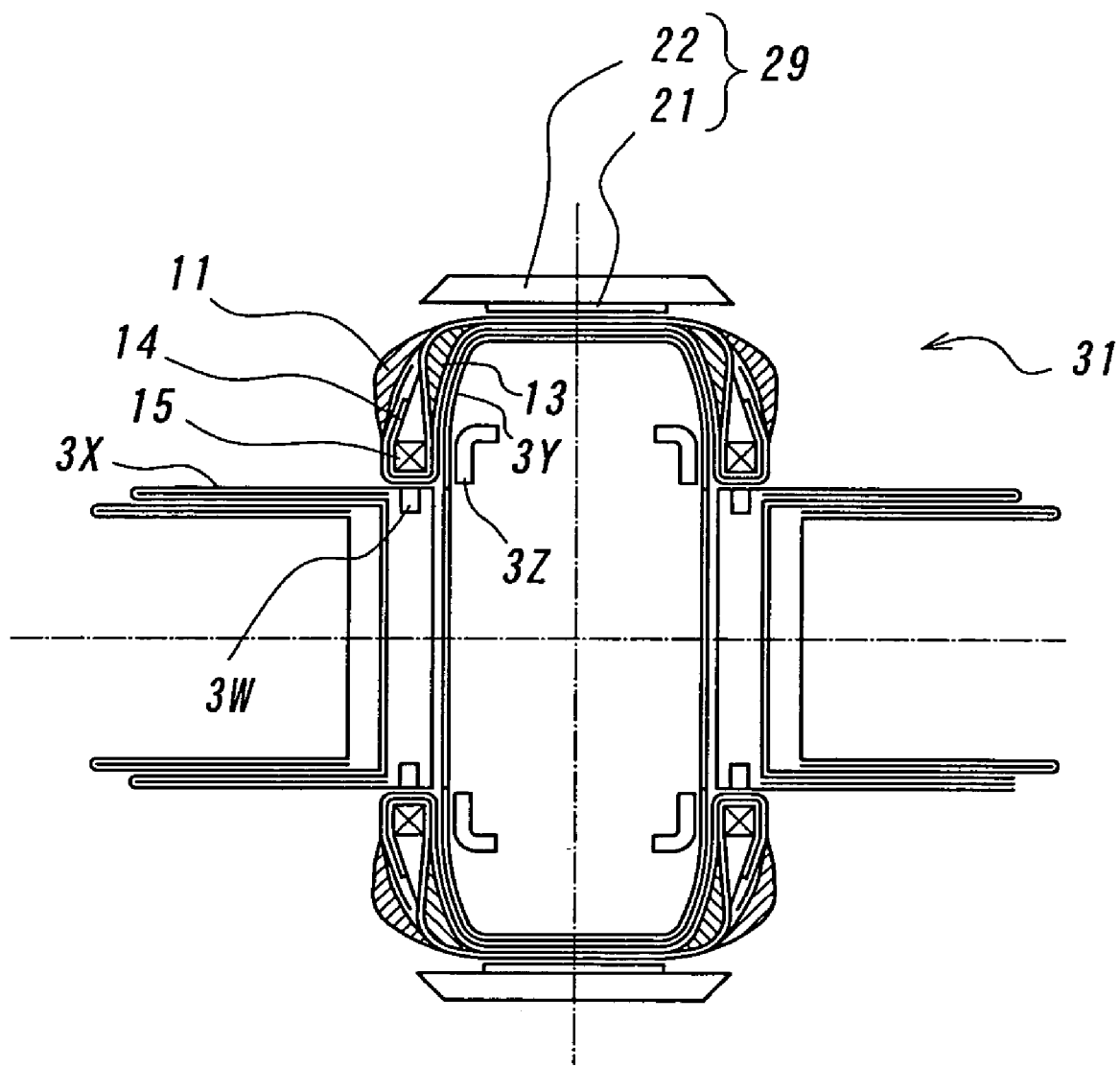
FIG. 15 is a front view partly shown in section illustrating a step followed by FIG. 14.

As shown in FIG. 15, the BT band 29 is gripped by the gripping ring 4X of the BT band transfer device 4 and located outward from the green case 31 in the radial direction. Subsequently, the size of the center bladder 3X is further enlarged to further expand the central portion of the green case 31 to thereby press to an inner periphery of the central portion of the BT band 29.

Figure 16:
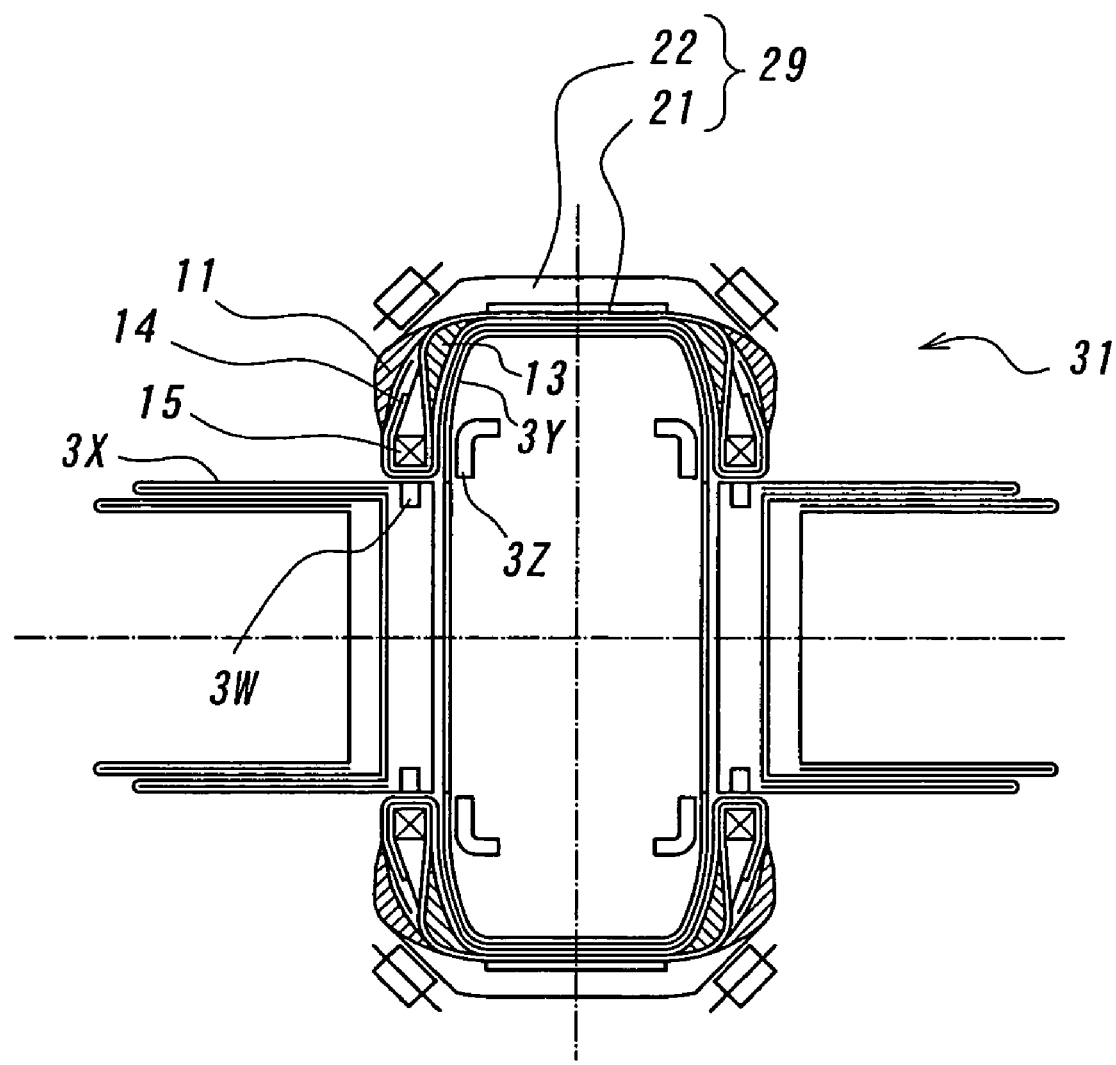
FIG. 16 is a front view partly shown in section illustrating a step followed by FIG. 15.

After the gripping ring 4X of the BT band transfer device 4 is backed out from the GT drum 3, as shown in FIG. 16, the end portion of the tread rubber 22 is stitched from outside in the radial direction to ensure the adhesion between the end portions of the tread rubber 22 and the sidewall rubber 11, whereby the building of the green tire 30 is completed.

Figure 17:
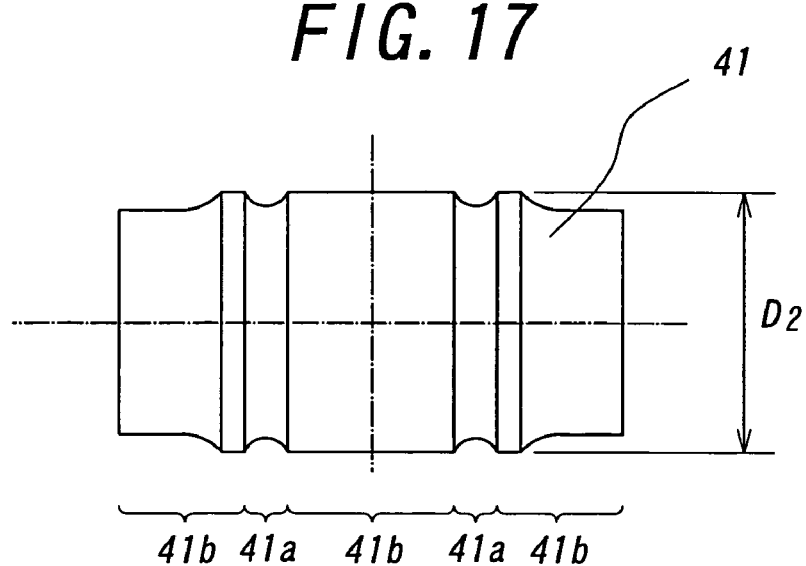
FIG. 17 is a front view partly shown in section illustrating a step of the tire manufacturing method in a second embodiment of the invention.

A second embodiment of the tire manufacturing method according to the invention will be described below. The second embodiment is different from the first embodiment in only a method of relatively reducing the size of the reinforcing rubber overlap region of the innerliner rubber 13 attached to the CB band with respect to the reinforcing rubber non-overlap regions and is the same in the manufacturing method of the other portions, so that only the different portion is described for simplifying the explanation. As shown in FIG. 17, a CB drum 41 used in the second embodiment is formed so that an outer diameter of a reinforcing rubber corresponding portion 41a is made smaller with respect to portions adjacent to the reinforcing rubber corresponding portion 41a. The diameter difference of the portion every axial position with respect to the outer diameter of the portion thereto is formed so as to be approximately two times the thickness of the reinforcing rubber 13 at each position in the axial direction. That is, the reinforcing rubber corresponding portion 41a of the drum 41 is constructed in the form of supplementing the section of the reinforcing rubber viewed from the meridional section.

Figure 18:
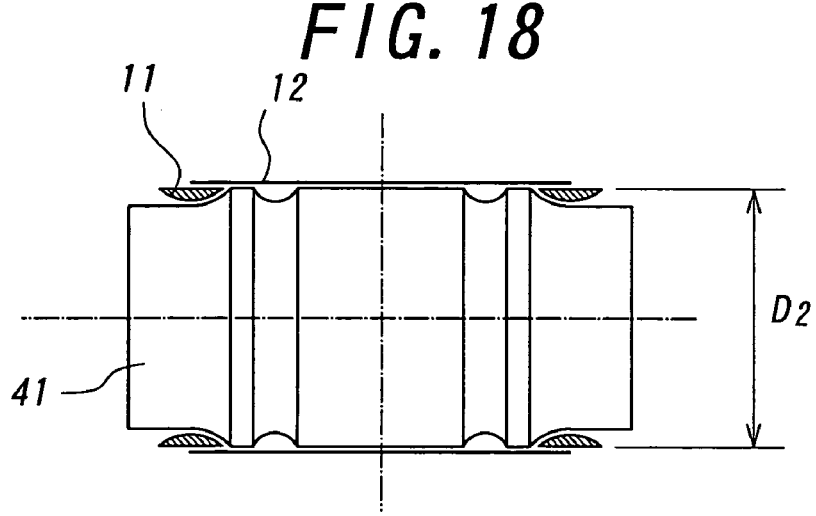
FIG. 18 is a front view partly shown in section illustrating a step followed by FIG. 17.
Figure 19:
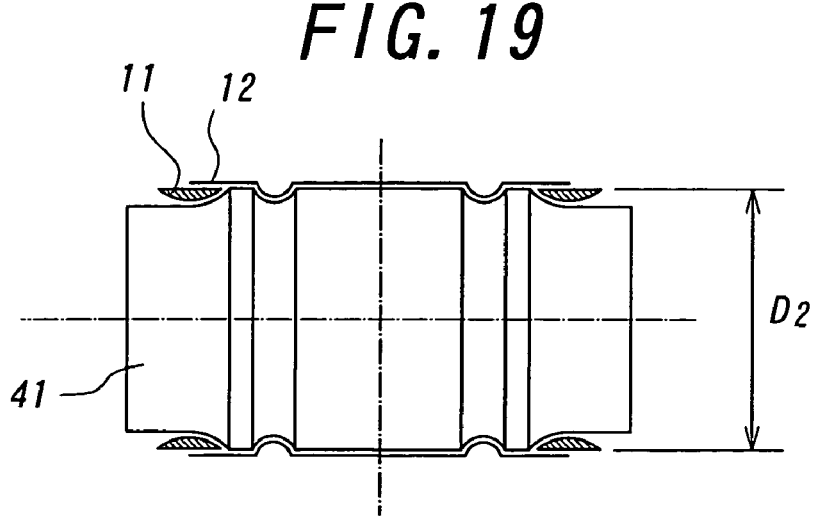
FIG. 19 is a front view partly shown in section illustrating a step followed by FIG. 18.
Figure 20:
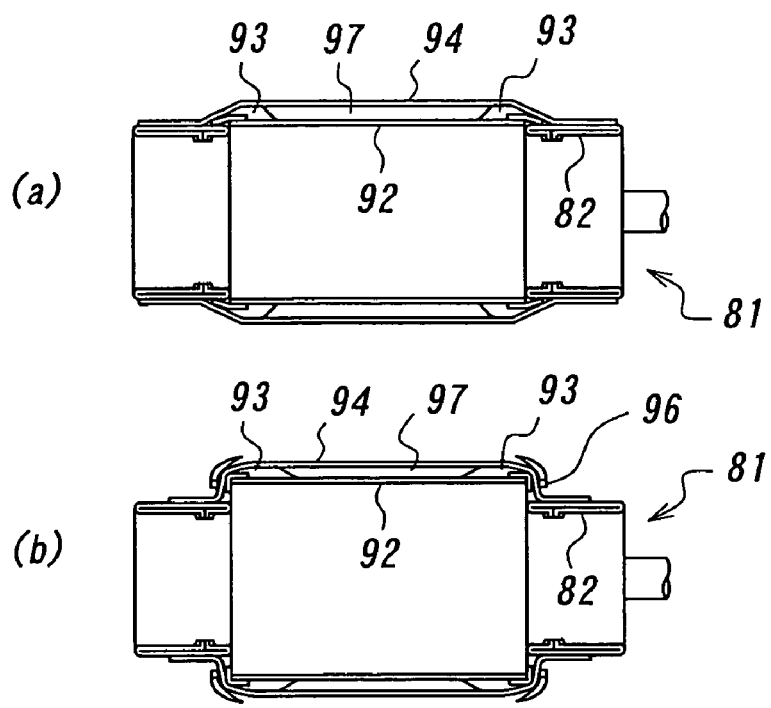
FIG. 20 is a front view partly shown in section illustrating the conventional tire manufacturing method.
Figure 21:
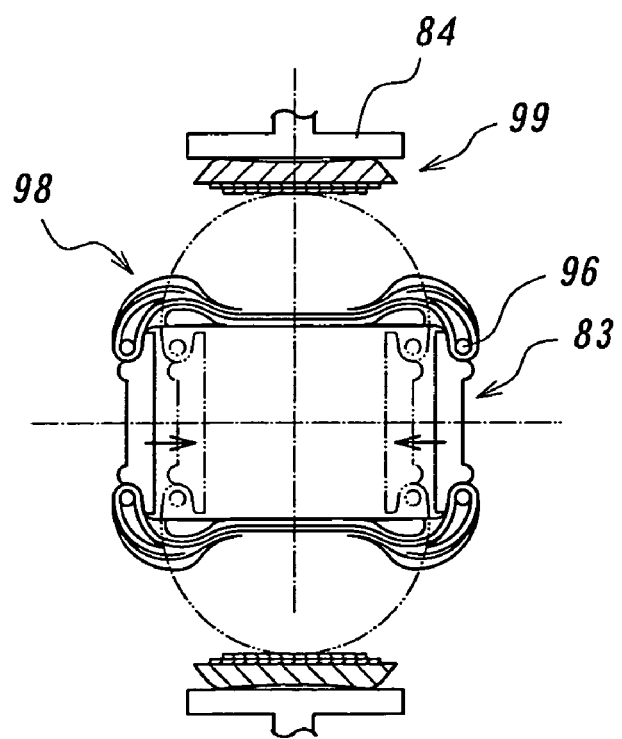
FIG. 21 is a front view partly shown in section illustrating the conventional tire manufacturing method.
Figure 22:
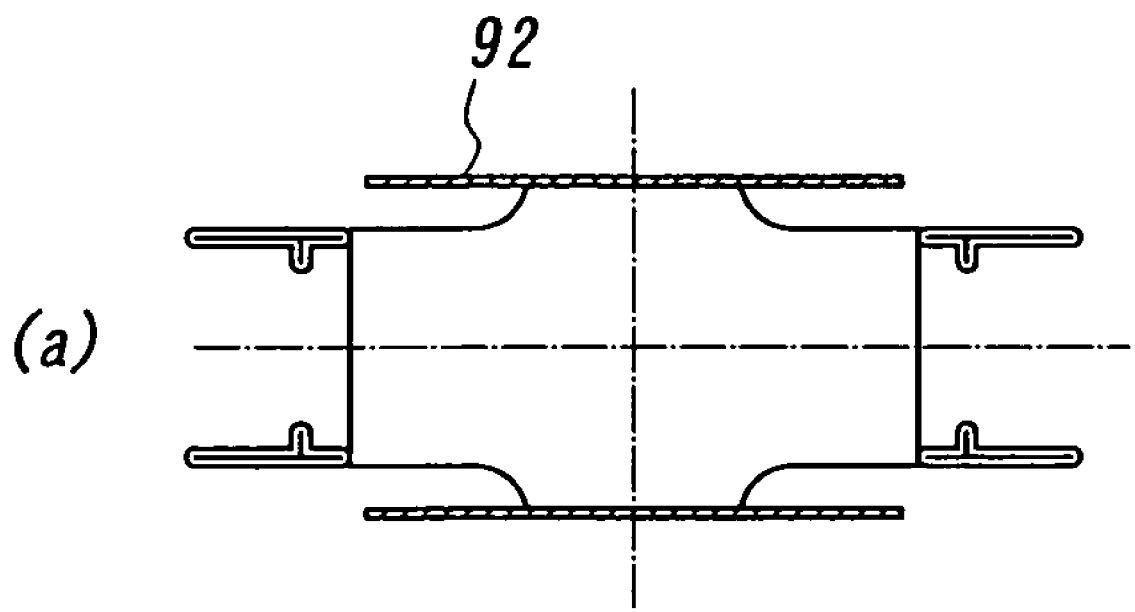
FIG. 22 is a front view partly shown in section illustrating the conventional tire manufacturing method.
Figure 22:
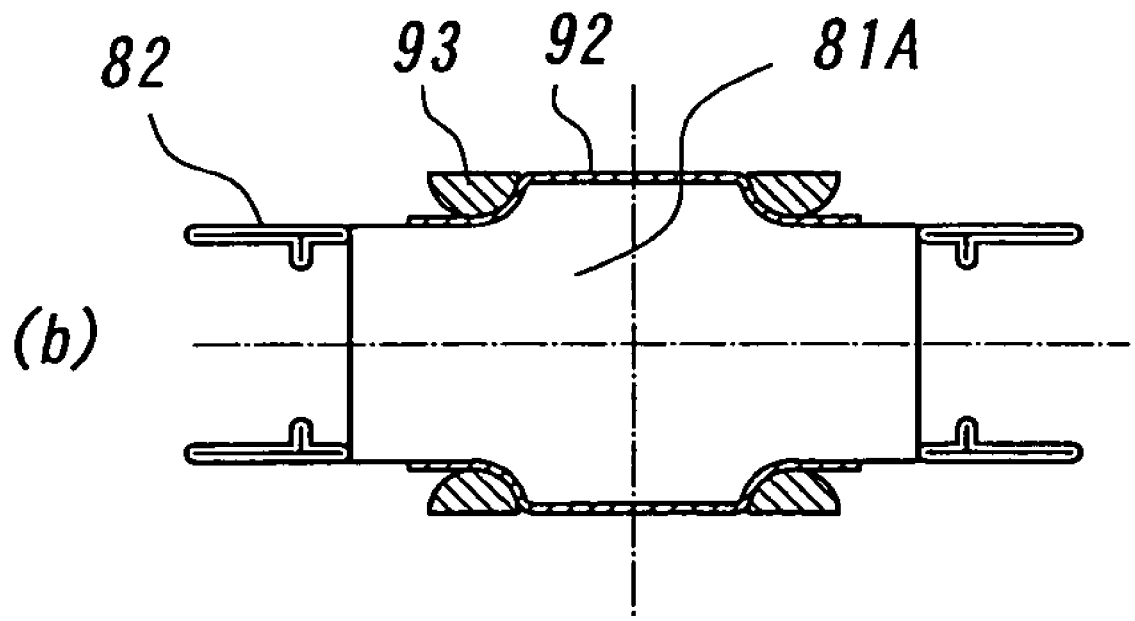

Also, the outer diameter of the CB drum 41 at a most size-reduced state is equal to D2 in the first embodiment. After the sidewall rubber 11 and the innerliner rubber 12 are attached onto the outer periphery of the CB drum 41 as shown in FIG. 18, a space portion defined by the reinforcing rubber overlap region of the innerliner rubber 12 and the reinforcing rubber corresponding portion 41a of the CB drum 41 is rendered into a negative pressure to close the reinforcing rubber overlap region of the innerliner rubber 12 to the reinforcing rubber corresponding portion 41a of the CB drum 41 as shown in FIG. 19. Thus, the size of the reinforcing rubber overlap region of the innerliner rubber 12 can be relatively reduced to the size of the reinforcing rubber non-overlap region.

INDUSTRIAL APPLICABILITY

As seen from the above, according to the invention, the carcass band before the turning of the carcass member around the bead core is transferred onto the green tire building drum of a cylindrical form from outside in the radial direction, so that the bead core can be accurately arranged with respect to the green tire building drum. Further, when the surface of the bead portion is gripped by the bead lock part of the green tire building drum, residual stress due to the turning is not caused in the bead portion, so that the bead core can be uniformly gripped over the full periphery with respect to the green tire building drum and the scattering of the relative position of the bead core with respect to the green tire building drum every the peripheral position can be largely reduced.

Furthermore, according to the invention, the innerliner rubber is attached onto the outer periphery of the first band building drum in the form of a cylinder and thereafter the size of the reinforcing rubber overlap region of the innerliner rubber is relatively reduced to that of the reinforcing rubber non-overlap region by approximately two times the thickness of the reinforcing rubber at positions every axial position and then the reinforcing rubber is attached onto the outer periphery of the relatively size-reduced reinforcing rubber overlap region of the innerliner rubber, so that the outer peripheral face connecting from the innerliner rubber in the reinforcing rubber non-overlap region to the reinforcing rubber can be made substantially flat. Moreover, the carcass member is attached onto substantially the flat outer peripheral face, so that the cord paths of the carcass member become stable over the full periphery and do not cause the scattering in the peripheral positions and hence the tire uniformity can be improved.

The invention claimed is:

1. A method of manufacturing a tire comprising a tread, a side-wall connecting to a side portion of the tread and extending inward in a radial direction, a bead core disposed at an inner peripheral side of the sidewall, a carcass toroidally extending between a pair of the bead cores and turned at its side portion around the bead core toward an outside in the radial direction, a belt disposed on a central portion of the carcass at an outer peripheral side thereof in an axial direction, an innerliner arranged at an inner peripheral side of the carcass, and a reinforcing rubber layer of substantially a crescent-shaped section interposed between the carcass and the innerliner, which comprises:

attaching a pair of sidewall rubbers and an innerliner rubber onto an outer periphery of a first band building drum of a cylindrical form to render them into a cylindrical form, attaching a pair of reinforcing rubbers of substantially a crescent-shaped section onto an outer periphery of the innerliner rubber, attaching a carcass member having a width wider than that of the innerliner rubber onto outer peripheries of the sidewall rubber, the innerliner rubber and the reinforcing rubber, setting a bead core onto an outer periphery of a portion of the carcass member located outward from the reinforcing rubber in an axial direction to build a carcass band, and transferring the carcass band from the first band building drum onto an outside of a cylindrical green tire building drum in a radial direction;

attaching a belt member and a tread rubber onto an outer periphery of a cylindrical second band building drum to build a belt-tread band having an inner diameter larger than an outer diameter of the carcass band, and transferring the belt-tread band from the second band building drum onto the outside of the green tire building drum in the radial direction;

toroidally enlarging a main body portion of the carcass member by reducing a distance between both the bead cores while holding the bead cores in the carcass band on the green tire building drum and pressing an outer periphery of an axially central portion of the carcass band to an inner periphery of the belt-tread band; and turning the sidewall rubber and a turnup portion of the carcass member while holding the bead cores in the carcass band on the green tire building drum;

wherein a diameter of a reinforcing rubber overlap region of the innerliner rubber to be attached with the reinforcing rubber is relatively and uniformly reduced with respect to a diameter of a reinforcing rubber non-overlap region corresponding to a remaining portion of the innerliner rubber prior to the attachment of the reinforcing rubber onto the outer periphery of the innerliner rubber at the first band building drum, and diameter reducing amounts of these overlap regions at positions in the axial direction are made approximately two times a thickness of the reinforcing rubber corresponding to each position in order to make the outer periphery of the first band building drum having the sidewall rubbers, the innerliner rubber and the reinforcing rubber thereon substantially flat prior to attaching the carcass member thereon, so that air is prevented from being trapped beneath the carcass member, and further comprising enlarging a diameter of a portion of the first band building drum corresponding to the reinforcing rubber non-overlap region of the innerliner rubber by approximately two times a maximum thickness of the reinforcing rubber outward in the radial direction to relatively reduce the diameter of the reinforcing rubber overlap region of the innerliner rubber.

2. A method of manufacturing a tire according to claim 1, wherein after the outer periphery of the axially central portion of the carcass band is pressed to the inner periphery of the belt-tread band on the green tire building drum, the belt-tread band is stitched onto the outer periphery of the main body portion of the carcass member in the carcass band over the full width and then the sidewall rubber and the turnup portion of the carcass member are turned.

3. A method of manufacturing a tire according to claim 1, wherein after the diameter of the main body portion of the carcass member is enlarged on the green tire building drum in a toroidal form while reducing the distance between both the bead cores, the sidewall rubber and the turnup portion of the carcass member are turned to press the sidewall rubber onto the carcass member over the full width and thereafter the belt-tread band is transferred on the outside of the green tire building drum in the radial direction and then the diameter of the carcass band is further enlarged to press the outer periphery of the axially central portion of the carcass band onto the inner periphery of the belt-tread band and further the belt-tread band is stitched on the outer peripheries of the sidewall rubber and the main body portion of the carcass member.

4. A method of manufacturing a tire according to claim 1, wherein after the carcass member is attached onto the first band building drum and before the setting of the bead core to the outer periphery of the carcass member, the first band building drum is enlarged in diameter by a given amount over the full length in the axial direction and then the outer peripheral face of the carcass member is stitched from the axial center toward the end portion.

5. A method of manufacturing a tire according to claim 1, wherein when the bead core is set to the outer periphery of the carcass member on the first band building drum, the setting of the bead core is carried out by locating the bead core in an axial setting position on the carcass member outward in the radial direction, enlarging the diameter of the first band building drum, and pressing the outer peripheral face of the carcass member to the inner peripheral face of the bead core.

6. A method of manufacturing a tire according to claim 1, wherein when the main body portion of the carcass member is toroidally enlarged on the green tire building drum, a rigid segment having an outer peripheral form corresponding to a part of an inner peripheral form of a reinforcing rubber layer in a product tire is moved outwardly in a radial direction of the tire while being pressed against an inner periphery of the innerliner rubber.

* * * * *